Patented Sept. 10, 1940

2,214,368

UNITED STATES PATENT OFFICE 2,214,368

PROCESS FOR THE RECOVERY OF LIQUIDS

Bernard S. Greensfelder and Louis R. Goldsmith, San Francisco, Calif., assignors to Shell Development Company, San Francisco, Calif., a corporation of Delaware Application August 29, 1938, Serial No. 227,271

6 Claims. (Cl. 62—175.5)

The present invention relates to an improved method for the recovery of liquids from gaseous mixtures containing a plurality of constitutents having substantially different boiling points. The invention further relates to an improvement in the method of recovering liquids from such gaseous mixtures wherein the condensation of one or more components of the gaseous mixture is effected by means of compression. More particularly the invention relates to a process for effecting the maximum economical separation and recovery of the liquid and gaseous components of such a mixture.

In its broader aspect the process of our invention consists in effecting the separation in a plurality of stages each operated at successively higher pressure, homogenizing separated liquid from each condensation stage with condensed liquid in a preceding stage, withdrawing homogenized liquid from the lowest pressure stage and withdrawing gaseous components from the highest pressure stage. The term "homogenizing" is used throughout the present description and claims to designate the step of mixing the liquids to produce a homogeneous solution more or less in equilibrium with the prevailing gaseous phase.

The advantages and objects of our process and its relation to prior known processes will be more readily understood and appreciated upon considering the following more detailed description of the process. The following description refers to and is illustrated by the attached drawings, Figure 1 of which shows a diagrammatic view of one assembly of apparatus which may be used in carrying into effect the principles of our invention. Figure 2 of the drawings illustrates diagrammatically a suitable arrangement of apparatus wherein the process of the invention is executed in a plurality of stages. It will be apparent from the following description that various forms of apparatus may be employed to carry out the several steps of the process. The present invention is therefore not to be limited to the assembly of apparatus shown in the attached drawings.

Figure 1:
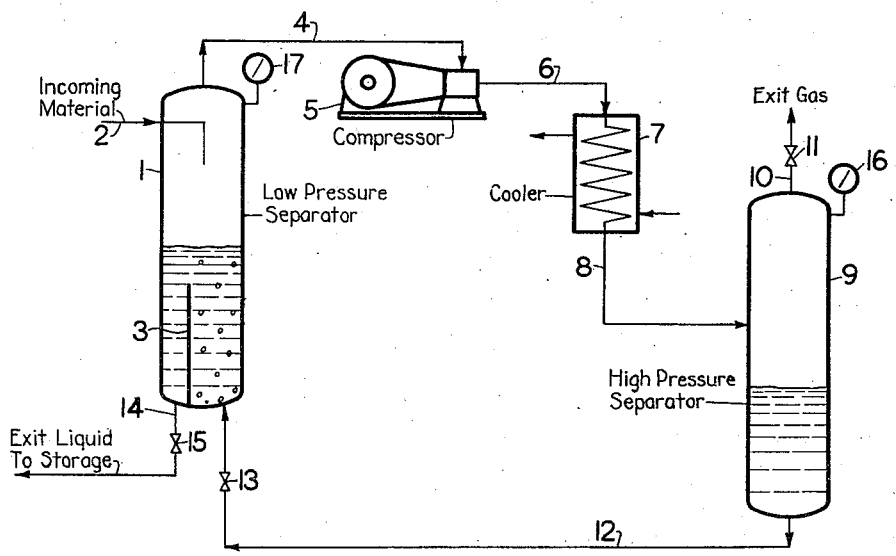
Figure 2:
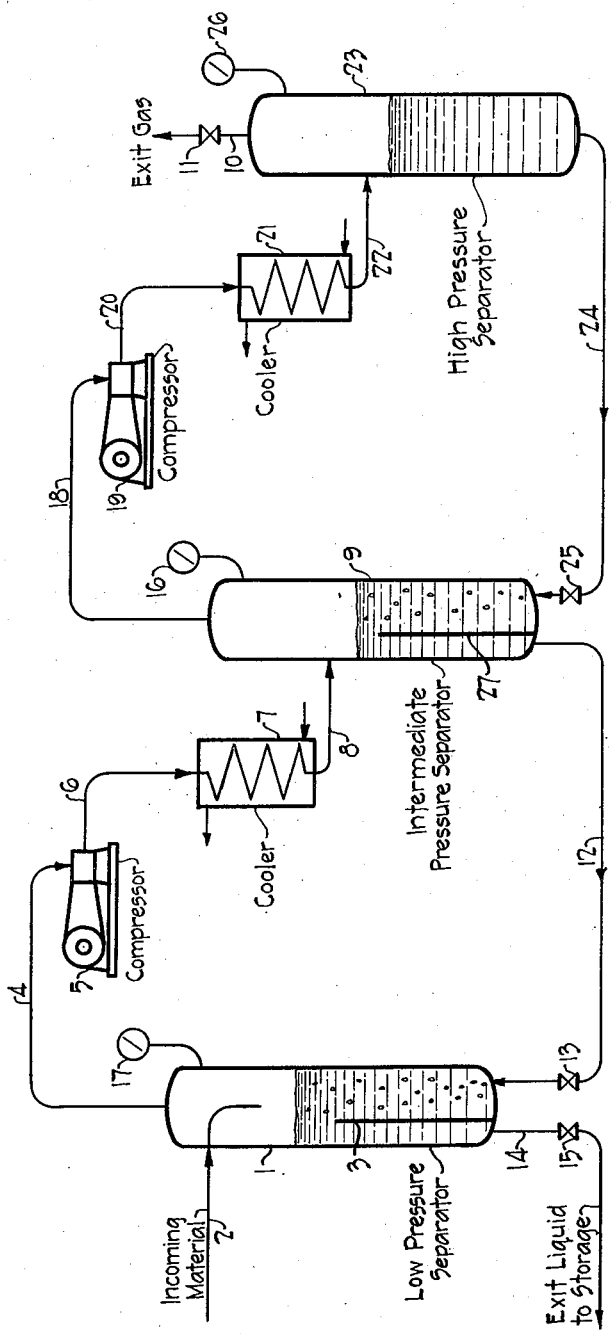

Referring to Figure 1, the attached drawings, I represents a separating vessel hereinafter referred to as the low pressure separator. The separator I shown in the drawing is a simple cylindrical vessel capable of withstanding the working pressure, provided with an inlet pipe 2 entering near the top, a vapor outlet pipe 4 situated at the top, a liquid outlet 14 provided with a valve 15 situated at the bottom, and an inlet pipe 12 (which will be referred to later) situated under the liquid level. If desired, separator I may be equipped with a pressure gauge 17 and/or other conventional accessories such as sight glasses, automatic liquid level controller, thermometer wells, drain cocks, insulation, etc. (not shown). The separator, as shown, is provided with a partition 3 situated between the inlet and outlet pipes 12 and 14 extending from the bottom up to a point near the working liquid level and dividing the lower portion of the separator into two compartments such that liquid entering via pipe 12 must pass over the partition before it can be withdrawn via pipe 14. The partition 3, the purpose of which is to allow more perfect equilibrium of the liquid to be reached and to effect a more complete homogenization of the liquid, may be dispensed with in many cases. Separator I may, moreover, be of any conventional shape or design and may be provided further with baffle plates, spray deflectors, screens, various packing materials, or the like for the purpose of improving the heat transfer, allowing more perfect equilibrium to become established, removing certain impurities from the contents, etc., if desired. As shown in the drawings, the inlet pipe 2 enters near the top and discharges into the vapor space at a convenient distance from the vapor outlet pipe 4. While the incoming material is preferably discharged into the vapor space this is not essential. The incoming liquid may be discharged below the liquid level if desired or may simply enter near the top provided suitable mechanical means are provided to prevent excessive liquid from passing out through the vapor and outlet pipe 4.

Nine (9) designates a second separating vessel, hereinafter referred to as the high pressure separator, provided with an inlet pipe 8, a vapor outlet pipe 10 provided with a control valve 11, and a liquid outlet 12, communicating with separator I and provided with a control valve 13. As with separator I, separator 9 may be of any conventional design, may be provided with baffles, packing materials, etc. (not shown), and may be equipped with any desirable accessories such as a pressure gauge 16, etc.

Five (5) designates a gas compressor of any conventional type so connected as to remove vapor from separator I via pipe 4 and compress the same into separator 9 via pipe 6, cooler 7 and pipe 8. The cooler 7 which may be of any conventional design, should preferably be of sufficient capacity to remove substantially all the heat caused by compression. In some cases it is desirable to operate separator 9 at a lower temperature than that prevailing in separator I. In such case the cooler 7 should be of sufficient capacity to provide the desired cooling. In other cases, it is found that no cooling is required, in which case the cooler 7 may be dispensed with.

The material to be separated enters the system as a mixture of liquid and vapor via pipe 2. If the material to be separated is normally a vapor it is necessary first to condense a portion of the less volatile material. This may be accomplished by cooling, compressing, or compressing and cooling the mixture before it enters the low pressure separator. If, on the other hand, the mixture is normally a liquid it is necessary first to vaporize the more volatile material. This may be accomplished by heating the mixture, reducing the pressure or both. The vapors from separator 1 pass through pipe 4, compressor 5, pipe 6, cooler 7, and pipe 8 to the high pressure separator 9 wherein condensed liquid separates. The uncondensed vapor escapes via outlet 10 and valve 11. The condensed liquid collecting in separator 9 is continuously withdrawn via pipe 12 and returned to separator 1, entering the latter at a point under the liquid level. The liquid in separator 9 is maintained at the desired level by adjusting valve 13. The liquid in separator 1 is maintained at the desired level by withdrawing the separated liquid phase at the desired rate via pipe 14 and valve 15. The pressure in the high pressure separator may be adjusted by means of valve 11.

Numerous modifications of the above described apparatus may be made without departing from the spirit of the invention. For example, the process may be executed in three or more stages, in which case the exit gases from pipe 10 would be compressed to a still higher pressure, cooled if desired, sent to a third separator and the condensate resulting from such treatment returned to the bottom of separator 9. The case with three stages is shown in Figure 2 of the drawings. Incoming material in pipe 2 enters the low pressure separator 1 equipped with the partition 3, vapor outlet pipe 4, a liquid outlet 14 provided with a valve 15 situated at the bottom and an inlet pipe 12 situated under the liquid level. Vapor leaving the low pressure separator 1 through pipe 14 is compressed by compressor 5, passed through pipe 6 to cooler 7 from which the compressed and cooled vapor and condensate is passed to an intermediate pressure separator 9 by means of pipe 8. The stratified condensate in the intermediate pressure separator 9, which is maintained at a higher pressure than separator 1 and is then passed through pipe 12 and valve 13 beneath the liquid level in the low pressure separator 1 wherein it is mixed and homogenized with the condensate therein. The vapor from the intermediate pressure separator flows through pipe 18 to compressor 19 from which the compressed material passes by means of pipe 20 to cooler 21. From cooler 21, the compressed and cooled material goes through pipe 22 to high pressure separator 23, operating at a higher pressure than separator 9, where it stratifies, the gas leaving through pipe 10 and valve 11 and the condensate returned through pipe 24 and valve 25 under the liquid level of intermediate pressure separator 9 wherein it is mixed and homogenized with the condensate therein. The valves 15, 13 and 25 may be used to control the amounts of condensate in the different pressure separators which may be equipped with various auxiliary accessories such as pressure gauges 17, 16 and 26. Intermediate pressure separator 9 is equipped with a baffle 27. The exit gases from the highest pressure separator may, if desired, be expanded in a suitable engine to produce work, or the expanded gases may be used for cooling.

The process as above described differs from prior art processes mainly in that the condensed liquid in the high pressure separator is returned and expanded into the condensate in the low pressure separator while in prior art processes the condensate from the high pressure separator is sent to storage.

We have found that in any system, such as that above described, embracing two or more pressure stages, certain advantages may be realized if the condensate from the higher pressure separator is returned to form a homogeneous solution with the condensate in a preceding lower pressure separator. When the system is operated in this manner, all of the ultimately separated liquid product is removed from the lowest pressure separator while the gaseous product is removed from the highest pressure separator. This results in a better recovery of more nearly pure gaseous components, a homogeneous liquid product of lower vapor pressure, and allows an increased ultimate yield of the desired liquid component.

The recycling of the condensate from the high-pressure separator, according to the present method, operates to establish new and more favorable equilibrium conditions throughout the system. The mixture to be separated may, for simplicity, be arbitrarily considered to be composed of three key components, A, B and C, wherein A represents the more non-volatile compound or group of compounds of the mixture, the most economical and complete recovery of which is desired, B represents one or more compounds miscible with and appreciably more volatile than A, and C represents one or more difficultly condensable compounds such as, for example, air, fixed gases or methane. As compared to prior art processes in which the condensate from the high pressure separator is not recycled, the vapor in the low pressure separator, according to the present process, is richer in component B; the condensed and separated product (withdrawn from the low pressure separator) is richer in component B; the exit vapor from the high pressure separator is richer in component B and leaner in component A; and the condensate in the high pressure separator is richer in component B and leaner in component A. Although the product withdrawn from the low pressure separator, according to the present process is somewhat richer in component B than it would be if recycling did not take place, this product is considerably leaner in component B than the total product obtained when recycling is not resorted to. This is due to the fact that in our process the product is withdrawn solely from the low pressure separator while in processes where recycling is not used the final product consists of the mixed condensates from the low and high pressure separators and is quite rich in component B. The general increase in concentration of component B throughout our system is therefore seen to be due to the fact that the relatively large quantities of component B in the condensate in the high pressure separator which would, without recycling, be removed as product is returned to the low pressure separator where it is, for the most part, flash evaporated, recycled through the system, and finally withdrawn as vapor from the highest pressure separator. The condensed and separated product obtained, according to our process, contains substantially all of component A and a relatively small quantity of component B. This product is therefore more completely stabilized and upon storage suffers only small losses due to the volatilization of component B. In the prior art processes, on the other hand, the individual condensates from the successive pressure stages are combined externally to the condensing and separating system. The product in this case is considerably richer in component B, and since the ultimate losses are dependent upon the concentration of component B present, the yield of stabilized product is considerably lower.

The present process may be used advantageously for the recovery of liquids from a large variety of mixtures such as, for example, the mixtures of materials formed in the vapor phase hydrogenation of ketones, hydrocarbons, etc., in the vapor phase oxidation of alcohols, hydrocarbons, etc., in the production of chlorinated hydrocarbons, liquid polymers, carbon disulfide, etc. The present process is of particular advantage where relatively large quantities of materials are handled, such as, for instance, in the recovery of stabilized gasoline fractions, the recovery of solvents, and in the production of isooctane. In the production of isooctane, for example, diisobutylene is hydrogenated in the vapor phase. The product leaving the hydrogenation unit consists of isooctane, unreacted hydrogen, and varying amounts of saturated hydrocarbons having from 1 to 8 carbon atoms. By using the present process an almost complete yield of isooctane may be recovered in a stabilized condition.

The pressures and temperatures to be employed in the various stages will vary according to the properties of the materials being handled and upon the degree of efficiency desired, and may be readily calculated for any given mixture according to the well known methods.

We claim as our invention:

1. A continuous multistage process for the recovery of liquids from mixtures of materials having substantially different boiling points, which comprises stratifying the material from which a liquid is to be recovered into a lower liquid phase and an upper vapor phase, removing and compressing said upper vapor phase into a second stage operated at a higher pressure, wherein stratification without appreciable fractionation takes place to form a condensate which is principally the higher boiling liquid to be recovered but which contains an appreciable amount of a lower boiling material, withdrawing the condensate from said higher pressure stage, introducing said condensate beneath the liquid level in the lower pressure stage in order to mix the same with the stratified liquid to form a homogeneous liquid in the lower pressure stage, the introduction of the condensate into the lower liquid phase releasing the lower boiling material into the upper vapor phase, withdrawing the recovered homogeneous liquid from said lower pressure stage, and withdrawing uncondensed vapor from said higher pressure stage.

2. A continuous multistage process for the recovery of liquids from mixtures of materials having substantially different boiling points, which comprises stratifying the material from which a liquid is to be recovered into a lower liquid phase and an upper vapor phase, removing and compressing said upper vapor phase, cooling said compressed vapors, stratifying without appreciable fractionation said compressed and cooled material in a second stage operated at a higher pressure to obtain a condensate which is principally the higher boiling liquid to be recovered but which contains an appreciable amount of a lower boiling material, withdrawing the stratified condensate from said higher pressure stage, introducing said condensate beneath the liquid level in the lower pressure stage in order to mix the same with the stratified liquid to form a homogeneous liquid in the lower pressure stage, the introduction of the condensate into the lower liquid phase releasing the lower boiling material into the upper vapor phase, withdrawing the homogeneous liquid from said lower pressure stage, and withdrawing uncondensed vapor from said higher pressure stage.

3. A continuous multistage process for the recovery of liquid hydrocarbons from mixtures thereof containing gaseous materials, which comprises stratifying the material from which the liquid hydrocarbons are to be recovered into a lower liquid phase and an upper vapor phase, removing and compressing said upper vapor phase, cooling said compressed vapors, stratifying without appreciable fractionation said compressed and cooled material in a second stage operated at a higher pressure to obtain a condensate which is principally the higher boiling liquid to be recovered but which contains an appreciable amount of a lower boiling material, withdrawing the stratified condensate from said higher pressure stage, introducing said condensate beneath the liquid level in the lower pressure stage in order to mix the same with the stratified liquid to form a homogeneous liquid in the lower pressure stage, the introduction of the condensate into the lower liquid phase releasing the lower boiling material into the upper vapor phase, withdrawing the homogeneous liquid hydrocarbons from said lower pressure stage, and withdrawing uncondensed vapors from said higher pressure stage.

4. A continuous multistage process for the recovery of isooctane from mixtures thereof containing hydrogen and lower boiling hydrocarbons, which comprises stratifying the materials from which the isooctane is to be recovered into a lower liquid phase and an upper vapor phase, removing and compressing said upper vapor phase, cooling said compressed vapors, stratifying said compressed and cooled material in a second stage operated at a higher pressure, withdrawing the stratified condensate from said highed pressure stage and introducing it beneath the liquid level in the lower pressure stage in order to mix the same with the stratified liquid to form a homogeneous liquid in the lower pressure stage, the introduction of the condensate into the lower liquid phase releasing the lower boiling material into the upper vapor phase. withdrawing the homogeneous isooctane from said lower pressure stage, and withdrawing uncondensed vapors from said higher pressure stage.

5. In a process for the recovery of isooctane from mixtures thereof containing hydrogen and lower boiling hydrocarbons wherein the more non-volatile components are condensed in a plurality of pressure stages operated at successively higher pressures, the steps comprising introducing condensate from a higher pressure stage beneath the liquid level in a lower pressure stage in order to mix the same with the iso-octane to form homogeneous liquid iso-octane in said lower pressure stage, the introduction of the condensate into the lower liquid phase releasing the lower boiling material into the upper vapor phase, withdrawing homogeneous isooctane from said lower pressure stage, and withdrawing uncondensed vapors from said higher pressure stage.

6. In a process for the recovery of isooctane from mixtures thereof containing hydrogen and lower boiling hydrocarbons wherein the more non-volatile components are condensed in plurality of pressure stages operated at successively higher pressures, the steps comprising introducing condensate from each higher pressure stage beneath the liquid level in the preceding lower pressure stage in order to mix the same with the stratified liquid to form a homogeneous liquid in said lower pressure stage, the introduction of the condensate into the lower liquid phase releasing the lower boiling material into the upper vapor phase, withdrawing homogeneous isooctane from the lowest pressure stage, and withdrawing uncondensed vapors from the highest pressure stage.

BERNARD S. GREENSFELDER.
LOUIS R. GOLDSMITH.